United States Patent [19]

van Deursen et al.

[11] 4,152,947

[45] May 8, 1979

[54] METHOD AND APPARATUS FOR CONTROLLING AN INFINITELY VARIABLE TRANSMISSION

[75] Inventors: Petrus H. van Deursen, Deurne; Hemmo H. J. Ludoph, Heeze, both of Netherlands

[73] Assignee: Van Doorne's Transmissie B.V., Netherlands

[21] Appl. No.: 765,054

[22] Filed: Feb. 2, 1977

[30] Foreign Application Priority Data

Feb. 9, 1976 [NL] Netherlands ..................... 7601286

[51] Int. Cl.$^2$ ............................................. F16H 55/52
[52] U.S. Cl. ............................................. 74/230.17 F
[58] Field of Search ................................ 74/230.17 F

[56] References Cited

U.S. PATENT DOCUMENTS

| | | | |
|---|---|---|---|
| 3,052,132 | 9/1962 | Dittrich et al. | 74/230.17 F |
| 3,280,649 | 10/1966 | Bruet | 74/230.17 F |
| 3,600,960 | 8/1971 | Karig et al. | 74/230.17 F |
| 3,872,842 | 3/1975 | Medley | 74/230.17 F X |
| 3,893,344 | 7/1975 | Dantlgraber et al. | 74/230.17 F |

FOREIGN PATENT DOCUMENTS 686344  5/1963  Canada ........................... 74/230.17 F

*Primary Examiner*—Leonard H. Gerin
*Attorney, Agent, or Firm*—Weingarten, Maxham & Schurgin

[57] ABSTRACT

The invention concerns the control of an infinitely variable transmission, provided with an endless transmission member running over a primary and a secondary V-shaped pulley, one conical disc of each pulley being affixed to a shaft, respectively the primary and the secondary shaft, and the other conical disc being controlled in axial direction by a hydraulic cylinder-piston unit, respectively the primary and the secondary cylinder-piston unit, the tension in the endless transmission member being controlled by means of a first control valve and that the transmission ratio is controlled by regulating fluid supply and discharge from and to the other cylinder by means of a second control valve.

27 Claims, 1 Drawing Figure

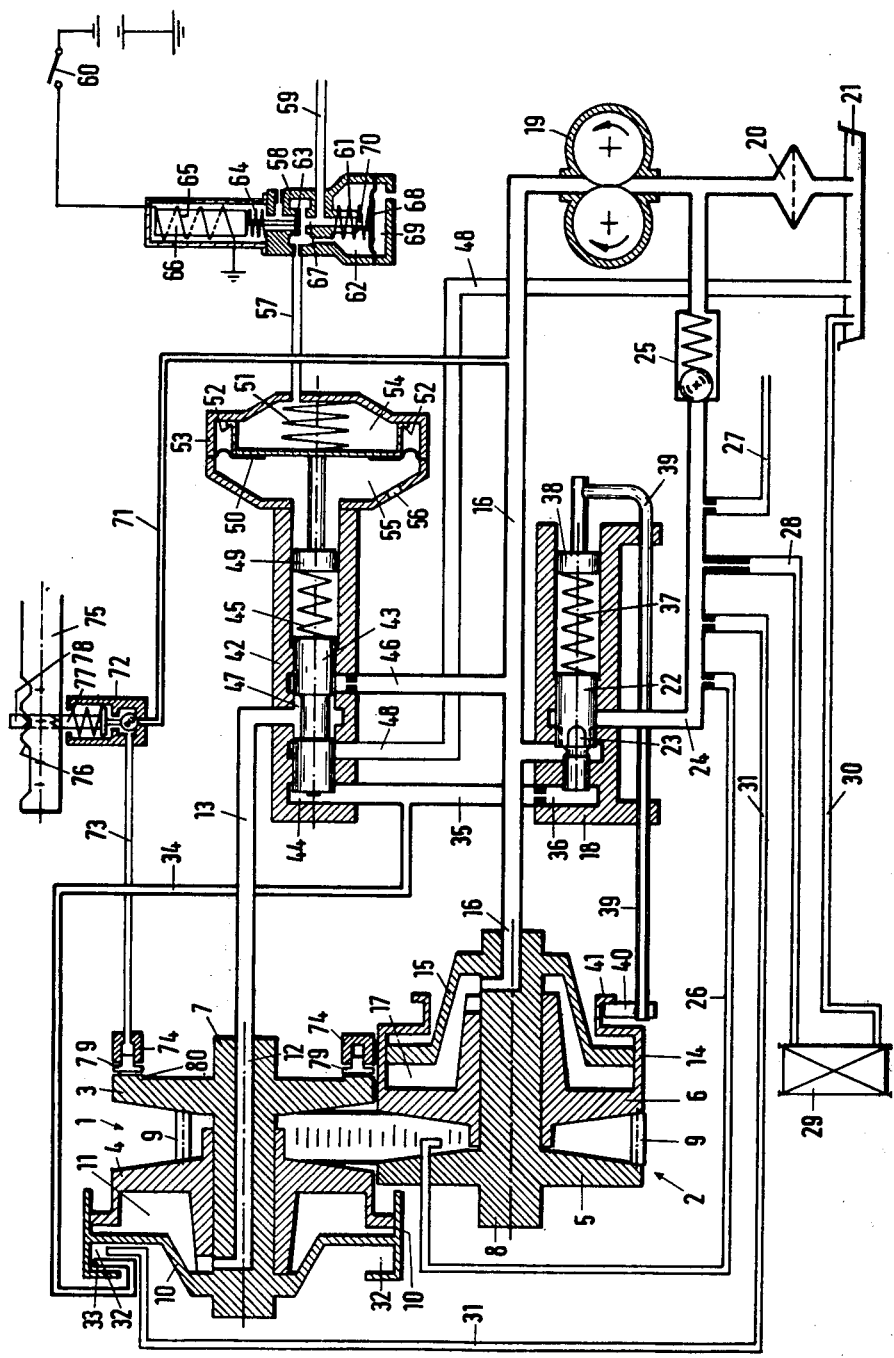

METHOD AND APPARATUS FOR CONTROLLING AN INFINITELY VARIABLE TRANSMISSION

The present invention relates to a method for controlling an infinitely variable transmission, provided with an endless transmission member which runs over a primary and a secondary V-shaped pulley, a conical disc of each pulley being connected with a shaft, respectively the primary and the secondary shaft, and the other conical pulley being controlled in axial direction by a hydraulic cylinder-piston unit, respectively the primary and the secondary cylinder-piston unit. Such a method is disclosed in British Pat. No. 989,227. The endless transmission member will be called driving belt in the specification.

For specific applications of the infinitely variable transmission, e.g. application in a vehicle driven by a combustion motor, very specific requirements are set to the control of the transmission. For instance a large variation of the input (primary) speed, and an associated variation in torque and power to be transmitted. It may be desirable in such a case that a rapid variation in transmission ratio is possible within a large range and under heavy load of the transmission. Highly important in this respect is that the tension in the driving belt is optimal and is each time adapted to the varying conditions. A proper tension is particularly of importance for a good yield of the transmission.

It is an object of the present invention to provide a control for an infinitely variable transmission, wherein it is possible, depending on the relevant operating conditions, each time to adequately maintain an optimal adjustment, there being obtained a high yield with avoidance of an excessive tension of the driving belt.

To this effect according to the invention the tension in the endless transmission member is regulated by controlling the fluid pressure in one of the cylinders by means of a first control valve, the transmission ratio being controlled by regulating fluid supply and discharge from and to the other cylinder by means of a second control valve. By so separating the control of the tension in the driving belt from the adjustment of the transmission ratio, it is possible to always maintain optimal operating conditions in the infinitely variable transmission.

It may be desirable that when starting a device provided with an infinitely variable transmission, the transmission always starts in a low gear, which means that the running diameter of the driving belt on the secondary pulley is maximal, and moreover it is desirable that, before the control of the transmission ratio becomes operative, the driving belt has the required tension, in connection with which the fluid pressure in the secondary cylinder according to the invention is preferably controlled by means of the first control valve and that the fluid supply and discharge to and from the primary cylinder is regulated by means of the second control valve. As a result the build-up of a fluid pressure by means of the first control valve in order to impart a specific tension to the driving belt results in that the required low gear is maintained as long as no fluid pressure build-up takes place in the primary cylinder.

In a preferred embodiment according to the invention the second control valve is supplied with fluid whose pressure is regulated by the first control valve. As a result the fluid used for adjusting transmission ratio, has a pressure depending on the actual tension in the driving belt, so that the speed with which said adjustment takes place does not depend on the variations in the load upon the driving belt. Since, when varying the transmission ratio, the pinch force of the pulley adjusting said transmission ratio should be capable of exceeding the pinch force of the pulley regulating the tension in the driving belt, the effective cross-section of the hydraulic cylinder-piston unit which adjusts the transmission ratio should be greater than the effective cross-section of the cylinder-piston unit which regulates the tension in the driving belt.

In order to allow application of a fluid pump having a fixed stroke volume for feeding the hydraulic control system, the first control valve according to the invention is preferably designed as an overflow valve which controls the fluid pressure in the output line of the fluid pump.

Furthermore, according to the invention, the fluid pressure can be controlled by means of the first control valve in dependence of the actual transmission ratio and/or the torque to be transmitted. In order to realize a specific tension in the driving belt, it is necessary to press the two conical discs of one of the pulleys towards each other with a force dependent on the size of the arc of wrap of the driving belt around said pulley. The larger the arc of wrap, the larger the pinch force required to effect a specific belt tension. The arc of wrap is directly dependent on the actual transmission ratio, so that the pinch force or the pressure controlled by the first control valve may be rendered dependent on the transmission ratio in order to control the tension in the belt. The dependence on the pressure control of the first control valve with respect to the torque to be transmitted aims at increasing the yield of the transmission by adjusting the tension in the driving belt to the torque to be transmitted.

According to a preferred embodiment of the method according to the invention, fluid pressure is controlled by means of the first control valve in dependence of the axial position of one of the movable conical discs, which position is a direct measure for the transmission ratio, and/or dependent on the speed of the primary pulley which is a measure for the maximum torque present supplied by the drive motor, e.g. when the drive motor is a combustion motor.

Furthermore according to the invention the second control valve may be designed as a balancing valve by means of which fluid is supplied and/or discharged to and from one of the cylinders depending on the difference between two forces exerted on the valve.

If the transmission is driven by a combustion motor, it is possible according to a feature of the invention, to control fluid supply and discharge by means of the second control valve depending on the speed of the primary pulley and the size of the pressure of the motor-drawn gas or on the position of the gas supply valve of the motor. It can be deduced from the pressure of the drawn gas, or motor vacuum, which is dependent on the position of the gas supply valve of the combustion motor and the primary speed whether the transmission ratio applied in a vehicle and driven by a combustion motor requires variation. In case the pressure of the drawn gas is relatively too high, the transmission is in too high a gear and in case the primary speed is relatively too high, the transmission is in too low a gear.

Furthermore the invention relates to an infinitely variable transmission provided with a driving belt which is applied over a primary and a secondary V- shaped pulley, one conical disc of each pulley being fixedly connected on a shaft, respectively the primary and the secondary shaft, and the other conical disc being controllable by a hydraulic cylinder-piston unit, which apparatus is furthermore provided with pumping means for the hydraulic fluid, which device according to the invention is characterized by a first control valve adapted for controlling the fluid pressure in one of the cylinders and a second control valve for regulating the fluid supply and discharge from and to the other cylinder.

Some embodiments of an apparatus according to the invention will now be described, by way of example, with reference to the accompanying drawings.

The FIGURE diagrammatically shows a variable transmission having a control as can be applied in a vehicle driven by a combustion motor.

As shown in the FIGURE the transmission is provided with a primary pulley 1 and a secondary pulley 2. These V-shaped pulleys each consist of two conical discs axially movable relative to one another. Pulley 1 comprises a conical disc 3 which is fixedly connected to the primary shaft 7 and a conical disc 4 which is mounted on the primary shaft 7 for axial movement, and e.g. is fixed by means of keyways against rotation relative to the primary shaft 7. Correspondingly the conical disc 5 of pulley 2 is affixed to the secondary shaft 8 and the conical disc 6 is axially movable on the secondary shaft 8. A driving belt 9 runs over the two pulleys.

The primary or input shaft 7 may be brought in rotation for instance by a combustion motor, as a result of which the secondary or output shaft 8 will rotate at a speed that is adjustable relative to the primary shaft 7. Said speed may be adjusted by varying the interspace of discs 3, 4; 5, 6 of each of the pulleys 1, 2.

The adjustment shown in the FIGURE of pulleys 1, 2 corresponds to a greater transmission ratio of the transmission, which means that the value input speed-/output speed is large. The axial distance between the conical discs 3 and 4 of pulley 1 is relatively large, while the axial distance between conical discs 5 and 6 of pulley 2 is relatively small.

The conical discs 4 and 6 movable on the respective shafts 7 and 8 are hydraulically controlled by means of piston-cylinder units. Disc 4 of primary pulley 1 is designed therefor as a piston which is movable in a cylinder 10 which is affixed to the primary shaft 7. The resulting cylinder space 11 is filled with hydraulic fluid which may be supplied and discharged through channel 12 in primary shaft 7 and line 13 communicating therewith.

The axially movable disc 6 of secondary pulley 2 is integrally connected to a cylinder 14 which can be moved relative to a piston 15 connected to the secondary shaft 8. By building up a fluid pressure via line 16 in cylinder space 17, conical disc 6 is urged towards disc 5, which results in a pinch force of the conical discs 5, 6 on driving belt 9. Said pinch force causes a specific tension in driving belt 9, which is necessary for transmitting a torque.

For controlling the amount of the fluid pressure in cylinder space 17, so of the amount of the pinch force, there is provided a first control valve 18 which, functioning as overflow valve, relieves the pressure of a pressurized fluid supplied from a reservoir 21 by a pump 19 via filter 20. As a result there always prevails an adjusted fluid pressure in line 16. The first control valve comprises a piston body 22 having recesses 23 which, in the opened position of the piston body 22 (in the FIGURE to the right) form a passage for fluid from line 16 to discharge line 24.

Discharge line 24 is kept at a slight fluid pressure by means of a spring-loaded non-return valve 25 for conducting through line 26 fluid for lubrication of driving belt 9 to the driving belt, lubricating other parts if necessary through line 27, for conducting through line 28 part of the fluid via cooler 29 and line 30 to reservoir 21 and for transporting fluid via line 31 to an annular groove 32 closed radially outwardly, which is affixed to cylinder 10 of the primary piston-cylinder unit 4, 10.

During rotation of primary pulley 1 and thereby of groove 32 concentrical relative to primary shaft 7, the fluid present in groove 32 will co-rotate. The speed of the fluid in groove 32 is measured by means of a Pitot tube 33, wherein a fluid pressure is built up depending on the speed of pulley 1 and said pressure is transmitted through lines 34 and 35 to space 36 of the first control valve 18. Upon increase of the primary speed the fluid pressure in space 36 is increased so that, as appears from the FIGURE, the piston body 22 is pushed to the right, which results in a reduction of the fluid pressure in line 16.

The piston body 22 on the other hand is subjected to a force directed to the left by coil spring 37, of which the pressure force is affected by a pushmember 38 which, via rod 39, is axially movable in accordance with the axial displacement of the conical disc 6 of secondary pulley 2. To this effect a pick-up member 40 is connected to rod 39, said member being contiguous with a rotary flange 41 on secondary cylinder 14. Pick-up member 40 is kept against the flange through spring 37. As shown in the FIGURE the force directed to the left on piston body 22 is reduced when conical disc 6 moves to the right, so when the interspace of conical discs 5, 6 of pulley 2 is increased. Said interspace and as a result the position of push member 38 is a direct measure for the actual transmission ratio. In case of a large transmission ratio push member 38 is moved to the left (the situation shown in the FIGURE), while a slight transmission ratio results in a position of push member 38 to the right and consequently in a smaller bias of spring 37, consequently a smaller force to the left on the piston body 22, which results in a fluid pressure reduction in line 16. This results in a reduction of the pinch force by discs 5, 6 of secondary pulley 2 on driving belt 9.

As explained in the above, the pinch force exerted by the conical discs 5, 6 of secondary pulley 2 on driving belt 9 depends on the primary speed and on the transmission ratio. The pinch force is increased upon reduction of the primary speed and upon increase of the transmission ratio.

In the infinitely variable transmission the transmission ratio is regulated by fluid supply and discharge to and from cylinder space 11 of the primary piston-cylinder unit 4, 10. When fluid is conducted to cylinder space 11, there will be a fluid pressure build-up therein and in case of sufficient pressure, the conical disc 4 of the primary pulley 1 forming the piston will move towards the conical disc 3, so that the diameter of the driving belt 9 on pulley 1 is increased. By the substantially fixed circumferential length of driving belt 9 and the fixed distance between the primary shaft 7 and the secondary shaft 8, the conical discs 5 and 6 of secondary pulley 2 will thereby be forced apart by driving belt 9, naturally while maintaining the pinch force of said discs 5, 6 controlled by the first control valve 18. This results in a reduction of the transmission ratio.

Cylinder space 11 is supplied with fluid from line 16, said fluid having the pressure regulated by the first control valve 18. Since this fluid pressure on conical disc 4 should be capable of exerting a greater force than on conical disc 6, in order to reduce the transmission ratio, the primary piston-cylinder unit 4, 10 has a larger active transverse surface than the secondary piston-cylinder unit.

The fluid supply and discharge from and to the cylinder space 11 is controlled by the second control valve 42, provided with a piston body 43. Piston body 43 is under influence of a force directed to the right, produced by fluid pressure in space 44, and a force directed to the left exerted by helical spring 45 in an equilibrium position. In said equilibrium position either fluid is supplied through line 46, space 47 and lines 13 and 12 to cylinder space 11, or fluid is discharged via lines 12, 13, space 47 and line 48 to the reservoir 21, or the quantity of fluid in cylinder space 11 is kept constant.

The fluid pressure in space 44 corresponds to the pressure measured by the Pitot tube 33, which pressure is transmitted through line 34 to space 44. A pressure increase in space 44, which is the result of an increase in the primary speed, results in a shift of the equilibrium position of the piston body 43 to the right and consequently in fluid supply, respectively a reduced fluid discharge, to respectively from cylinder space 11. Fluid supply to cylinder space 11 results in a reduction of the transmission ratio. An increase in the primary speed consequently results in a tendency to reduce the transmission ratio.

Helical spring 45 is biased under influence of push member 49 which is connected to diaphragm 50 downstream of which there is disposed helical spring 51. As a result the bias of helical spring 45 can be regulated depending on the pressure difference of the gas on either side of diaphragm 50. Diaphragm housing 53 is divided by means of diaphragm 50 into two spaces 54 and 55. Space 55 is connected via opening 56 to the atmosphere and space 54 wherein is present helical spring 51, is connected e.g. by means of line 57 through valve 58 and line 59 to the inlet manifold of the combustion motor driving the transmission. When valve 58 is in the opened position (the position shown in the FIGURE) there prevails in space 54 the same pressure as in the inlet manifold of the drive motor, resulting in a specific position of diaphragm 50. When, in case the throttle is opened, so when increasing the power output of the drive motor, the pressure in the inlet manifold is increased, the diaphragm 50 will move to the left, which results in an increase in the force on piston body 43 directed to the left. This again results in an increased fluid discharge from, respectively a reduced fluid supply to the primary cylinder space 11, so a tendency to increase the transmission ratio of the transmission.

Diaphragm 50 is provided with a stop 52 which limits the movement of the diaphragm to the right, thus attaining that a further reduction of the pressure in the inlet manifold below a predetermined value has no influence.

If the transmission is mounted in a vehicle and is driven by a combustion motor, valve 58 serves as a so-called mountain brake. When putting the brake on the vehicle motor, a very low pressure prevails in the inlet manifold, while yet a relatively small transmission ratio is desired. Valve 58 is provided with a valve body 63, which through helical spring 64 is kept in the opened position (upwards in the FIGURE), so that lines 57 and 59 communicate with each other. By means of switch 60 the electric winding 65 can be energized which presses a core 66 and likewise valve body 63 against the action of spring 64 and shutting off outlet 67 of line 59. Line 59 as a result communicates with line 57 via space 62. Space 62 is separated by means of diaphragm 68 from a space 69 where atmospheric pressure prevails. By helical spring 61 diaphragm 68 is pushed from the second nozzle 70 of line 59.

In case the mountain brake is engaged, so when the outlet 67 is shut off, and at a prevailing low pressure in line 59, the pressure in space 62 will drop until the diaphragm 68 will be depressed against the action of helical spring 61 so that outlet 70 is shut off by diaphragm 68. By engaging the mountain brake consequently, the pressure drop of the gas in space 54 is limited, so that the transmission ratio of the transmission does not increase too much.

If, between the transmission and the drive motor, there is disposed a clutch, e.g. a centrifugal clutch or a fluid clutch, it may be desirable to arrest the transmission in de-clutched condition, for instance during the reversal of the rotation direction of the output shaft by means of a reversing clutch provided on the output or secondary shaft 8. For arresting the transmission, a line 71 is connected via valve 72 and line 73, to a brake cylinder 74. By shifting control rod 75 with cam surface 76, valve rod 77 with cam follower 78 is axially displaced, so that fluid in line 16 may communicate with brake cylinder 74, wherein a pressure can be built up pushing the brake shoe 79 designed as piston in brake cylinder 74 against a brake disc forming portion 80 of conical disc 3 of pulley 1. Upon s specific movement of control rod 75, which may also operate the reversing clutch, the transmission is arrested.

If the transmission is applied in a vehicle, the bias of spring 45 may also depend on the position of the accelerator of the vehicle, by a mechanical link between the accelerator and piston 49.

We claim:

1. A method for controlling an infinitely variable transmission of the type provided with first and second V-shaped pulleys and an endless transmission member running therebetween, each of the first and second pulleys being comprised of a pair of facing, coaxially rotatable conical discs, a first conical disc of each of the first and second pulleys being affixed to a shaft, respectively designated the first and second shafts, first and second hydraulic cylinder-piston units, one of the units being associated with each of the pulleys, each cylinder-piston unit having a cylinder and a piston, the first and second cylinder-piston units being adapted to control the axial position of the second conical disc with respect to the first conical disc of the first and second pulleys, respectively, said method comprising the steps of:

regulating the fluid pressure in one of the cylinders of the first and second cylinder-piston units to control the tension in the endless transmission member; and
regulating the fluid supply and discharge from and to the other cylinder to control the transmission ratio.

2. The method of claim 1 wherein a first control valve is used to regulate the fluid pressure in the cylinder controlling the tension in the endless transmission member and a second control valve is used to regulate the fluid supply and discharge from and to the cylinder which controls the transmission ratio.

3. The method of claim 2 wherein the second control valve is supplied with fluid whose pressure is controlled by the first control valve.

4. The method of claim 2 wherein fluid pressure is generated by a fluid pump and the first control valve is an overflow valve which regulates the fluid pressure in an output line of the fluid pump.

5. The method of claim 2 wherein the first control valve regulating the fluid pressure in one of the cylinders is responsive to at least one of either the actual transmission ratio and the torque to be transmitted by the transmission.

6. The method of claim 2 wherein the cylinder in which fluid pressure is controlled is the second cylinder and the cylinder in which fluid supply and discharge to and from thereto are controlled is the first cylinder.

7. The method of claim 2 wherein the first control valve is responsive to at least one of the axial positions of one of the movable, second conical discs and the rotational speed of the first pulley.

8. The method of claim 2 wherein the second control valve is a balancing valve, whereby fluid is supplied to or discharged from one of the cylinders depending on the difference between two forces exerted on the valve.

9. The method of claim 2 wherein the second control valve is responsive to at least one of the rotational speed of the first pulley and the torque to be transmitted by the transmission.

10. A method for controlling an infinitely variable transmission driven by a combustion motor, said transmission being of the type provided with an endless transmission member running over first and second V-shaped pulleys, each of the first and second pulleys being comprised of a pair of facing, coaxially rotatable conical discs, a first conical disc of each of the first and second pulleys being affixed to a shaft, respectively being the first and second shafts, a hydraulic cylinder-piston unit associated with each of the pulleys, respectively being the first and second cylinder-piston units, the first and second cylinder-piston units being adapted to control the axial position of the second conical disc of the first and second pulleys, respectively, a first control valve for regulating the fluid pressure in the second cylinder to control the tension in the endless transmission member, and a second control valve for regulating the fluid supply and discharge to and from the first cylinder to control the transmission ratio, the method comprising the step of varying the fluid supply and discharge controlled by the second control valve in response to the rotational speed of the first pulley and at least one of the magnitude of the pressure of the motor-drawn fuel and the position of the fuel supply valve of the motor.

11. An infinitely variable transmission comprising, in combination, first and second V-shaped pulleys, an endless transmission member disposed between the pulleys, each of the pulleys comprising a pair of facing, coaxially rotatable conical discs, a first conical disc of each pulley being fixedly connected to a shaft, respectively identified as first and second shafts, first and second cylinder-piston units associated respectively with the first and second pulleys, each of the cylinder-piston units having a hydraulic cylinder and a piston, the axial position of the second conical disc of each pulley being controllable with respect to the first conical disc by the hydraulic cylinder-piston unit associated with said pulley, pumping means for supplying hydraulic fluid to said cylinder-piston units, a first control valve for controlling fluid pressure in one of the cylinders of the first and second cylinder-piston units to control the tension in the endless transmission member, and a second control valve for regulating the fluid supply to and discharge from the other cylinder to control the transmission ratio.

12. The apparatus of claim 11 wherein the first control valve is adapted to control the fluid pressure in the second cylinder and the second control valve is adapted to control the fluid supply to and discharge from the first cylinder.

13. The apparatus of claim 11 further including a fluid supply line through which fluid is supplied to the second control valve and a line for the pressure controlled by the first control valve, the fluid supply line to the second control valve being connected to the line for the pressure controlled by the first control valve.

14. The apparatus of claim 11 wherein the first control valve is an overflow for regulating the fluid pressure supplied by the pumping means.

15. The apparatus of claim 11 further including detection means for providing a signal responsive to at least one of the transmission ratio and the transmitted torque, and the first control valve being responsive to the signal provided by the detection means.

16. The apparatus of claim 15 wherein the detection means comprises a follower adjoining a guide face disposed on one of the axially movable, second conical discs of said pairs of discs, the follower including a spring, the first control valve including a valve body, and the follower exerting a force via said spring on said valve body.

17. The apparatus of claim 11 further including detection means for providing a signal responsive to the rotational speed of the first shaft, and at least one of the first and second control valves being responsive to the signal provided by the detection means.

18. The apparatus of claim 17 wherein the detection means comprises a Pitot tube and an annular groove connected to the first shaft and closed radially outwardly, the Pitot tube being adapted to take up the fluid pressure in the annular groove and being connected through a fluid line to an operating space for at least one of the first and second control valves to exert a force on at least one of the respective valve bodies.

19. The apparatus of claim 11 wherein the second control valve is a balancing valve responsive to two forces exerted thereon.

20. The apparatus of claim 11 wherein the transmission is adapted to be driven by a combustion motor and further includes means responsive to at least one of the pressure of the fuel drawn by the combustion motor and the position of the fuel supply valve of the combustion motor, for controlling the second control valve.

21. The apparatus of claim 20 wherein the combustion motor includes an inlet manifold and the means for controlling the second valve includes: a chamber operatively connected to the inlet manifold of the combustion motor, a closure member for shutting off the chamber from the inlet manifold, a spring associated with the closure member such that the position of the closure member determines the bias of the spring, the spring being adapted to exert a force on the valve body of the second control valve.

22. The apparatus of claim 21 wherein the connection between the inlet manifold of the combustion motor and the chamber includes a fluid conduit.

23. The apparatus of claim 22 wherein the fluid conduit includes a disengageable control member which is adapted to shut off the fluid conduit at a low pressure of the motor-drawn fuel.

24. The apparatus of claim 11 further including a clutch for disengageably connecting the drive motor to the first pulley.

25. The apparatus of claim 24 wherein the conical disc of the first pulley which is fixedly connected to the first shaft has an annular braking surface against which at least one braking shoe can be pressed.

26. A method for controlling an infinitely variable transmission of the type provided with first and second V-shaped pulleys and an endless transmission member running therebetween, each of the first and second pulleys being comprised of a pair of facing, coaxially rotatable conical discs, a first conical disc of each of the first and second pulleys being affixed to a shaft, respectively designated the first and second shafts, a hydraulic cylinder-piston unit associated with each of the pulleys, respectively identified as the first and second cylinder-piston units, the first and second cylinder-piston units being adapted to control the axial position of the second conical disc with respect to the first conical disc of the first and second pulleys respectively, said method comprising the steps of:

regulating the fluid pressure in one of the first and second cylinder-piston units to control the tension in the endless transmission member by means of a pinch force exerted on the endless transmission member by axial positioning of the second disc of the pair of facing conical discs of the pulley associated with said one of the cylinder-piston unit, the pinch force being a function of at least one of either the transmission ratio and the speed of rotation of the first shaft; and regulating the fluid supply and discharge from and to the other cylinder-piston unit to control the transmission ratio.

27. An infinitely variable transmission comprising, in combination, first and second V-shaped pulleys, an endless transmission member disposed between the pulleys, each of the pulleys comprising a pair of facing, coaxially rotatable conical discs, a first conical disc of each pulley being fixedly connected to a shaft, respectively identified as first and second shafts, first and second cylinder-piston units associated respectively with the first and second pulleys, the axial position of the second conical disc of each pulley being controllable with respect to the first conical disc by the hydraulic cylinder-piston unit associated with said pulley, pumping means for supplying hydraulic fluid to said cylinder-piston units, a first control valve for controlling fluid pressure in one of the cylinder-piston units to control the tension in the endless transmission member by the exertion of a pinch force on the transmission member by axial positioning of the second disc of the facing conical discs of the pulley associated with said one of the cylinder-piston units, the pinch force being a function of at least one of either the transmission ratio and the rotational speed of the first shaft, and a second control valve for regulating the fluid supply to and discharge from the other cylinder-piston unit to control the transmission ratio.

* * * * *